(12) United States Patent
Morisaki et al.

(10) Patent No.: US 12,202,618 B2
(45) Date of Patent: Jan. 21, 2025

(54) FAN DEVICE AND AIRCRAFT HAVING THE SAME

(71) Applicant: MITSUBISHI HEAVY INDUSTRIES, LTD., Tokyo (JP)

(72) Inventors: Yuki Morisaki, Tokyo (JP); Suguru Hase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 222 days.

(21) Appl. No.: 18/010,613

(22) PCT Filed: Jan. 13, 2022

(86) PCT No.: PCT/JP2022/000992
§ 371 (c)(1),
(2) Date: Dec. 15, 2022

(87) PCT Pub. No.: WO2022/154059
PCT Pub. Date: Jul. 21, 2022

(65) Prior Publication Data
US 2023/0257132 A1    Aug. 17, 2023

(30) Foreign Application Priority Data
Jan. 18, 2021   (JP) .................................. 2021-005962

(51) Int. Cl.
*B64D 33/08*   (2006.01)
*B64C 11/00*   (2006.01)
(Continued)

(52) U.S. Cl.
CPC ............ *B64D 33/08* (2013.01); *B64C 11/001* (2013.01); *B64C 29/0033* (2013.01); *H02K 1/20* (2013.01)

(58) Field of Classification Search
CPC .. H02K 5/00; H02K 5/04; H02K 5/12; H02K 5/20; H02K 5/207; H02K 5/26;
(Continued)

(56) References Cited

U.S. PATENT DOCUMENTS

2008/0219844 A1* 9/2008 Decker ................. F04D 25/082
                                                           415/219.1
2010/0140416 A1   6/2010 Ohanian, III et al.
(Continued)

FOREIGN PATENT DOCUMENTS

| EP | 2808247 A1 | 12/2014 |
| JP | 2013-079606 A | 5/2013 |
| JP | 2020-093706 A | 6/2020 |

OTHER PUBLICATIONS

International Search Report issued in corresponding International Application No. PCT/JP2022/000992, mailed Apr. 5, 2022 (5 pages).

*Primary Examiner* — Tran N Nguyen
(74) *Attorney, Agent, or Firm* — Osha Bergman Watanabe & Burton LLP

(57) ABSTRACT

A fan device includes: a fan including a plurality of blades each extending in a radial direction relative to a rotation axis, the fan being configured to rotate about the rotation axis and generate an airflow; a rotor core provided outside in the radial direction of the fan; a stator core provided at a position facing the rotor core in the radial direction; a housing that forms an inner circumferential surface surrounding the fan about the rotation axis and that internally includes an accommodation space accommodating the rotor core and the stator core; and a compressor configured to compress air. The inner circumferential surface of the housing has a cylindrical surface and a nozzle surface whose diameter expands outward in the radial direction along the
(Continued)

rotation axis in downstream in a flow direction of an airflow relative to the cylindrical surface.

8 Claims, 10 Drawing Sheets

(51) Int. Cl.
*B64C 29/00* (2006.01)
*H02K 1/20* (2006.01)
*H02K 5/20* (2006.01)

(58) Field of Classification Search
CPC .. H02K 9/00; H02K 9/04; H02K 9/06; H02K 9/08; H02K 9/10; B64D 33/04; B64D 33/08; B64D 27/34; B64C 11/00; B64C 11/001; B64C 21/04; B64C 15/14; B64C 29/00; B64C 29/003; B64C 29/0033
See application file for complete search history.

(56) References Cited

U.S. PATENT DOCUMENTS

| | | |
|---|---|---|
| 2018/0229851 A1 | 8/2018 | Joshi et al. |
| 2019/0203735 A1 | 7/2019 | Hoefler et al. |
| 2019/0292993 A1 | 9/2019 | Pal |
| 2021/0107664 A1* | 4/2021 | Rabbi .................... B64D 33/08 |
| 2021/0323688 A1 | 10/2021 | Yajima et al. |

* cited by examiner

FAN DEVICE AND AIRCRAFT HAVING THE SAME

TECHNICAL FIELD

The present disclosure relates to a fan device and an aircraft having the same.

BACKGROUND ART

Examples of electric fans employed in electric Vertical Take-off and Landing (eVTOL) aircrafts include fans having a duct (so-called ducted fans). Ducted fans are categorized into two types in terms of drive types. One is the inner circumferential drive type in which a hub connected with a plurality of blades is rotated and driven by a motor. The other is the outer circumferential drive type in which a motor is formed of rotor cores provided at tips of blades and stator cores provided so as to face the rotor cores so that the fan is rotated and driven by the motor.

The motor employed in such an electric fan requires large motor capacity. It is thus essential to cool the motor during operation of the electric fan. For example, in an electric fan of the outer circumferential drive type, it is required to cool rotor cores provided on the tip side of blades and stator cores provided so as to face the rotor cores (as in Patent Literature 1).

CITATION LIST

Patent Literature

[PTL 1] Japanese Patent Application Laid-Open No. 2020-93706

SUMMARY OF INVENTION

Technical Problem

Typical helicopters, which differ from eVTOL aircrafts, may have an autorotation function. The autorotation function is a function of, in case of an engine failure, disconnecting a link between the engine and propellers and suitably changing the angle of attack of blades, so that fall energy is converted into rotation of the propellers to ensure aerodynamic lift.

In eVTOL aircrafts, however, the electric fan is smaller than the propeller of helicopters, and the angle of attack of the blades may often be designed unchangeable in order to avoid an increase in complexity or size of the device. Thus, in eVTOL aircrafts, it is not possible to use the autorotation function as with helicopters.

The present disclosure has been made in view of such circumstances and intends to provide a fan device that can obtain constant thrust even when a fan thereof stops and also can cool a motor in a normal state and to provide an aircraft having such a fan device.

Solution to Problem

To solve the above problem, a fan device and an aircraft having the same of the present disclosure employ the following solution.

A fan device according to one aspect of the present disclosure includes: a fan including a plurality of blades each extending in a radial direction relative to a rotation axis, the fan being configured to rotate about the rotation axis and generate an airflow; a rotor core provided outside in the radial direction of the fan; a stator core provided at a position facing the rotor core in the radial direction; a housing that forms an inner circumferential surface surrounding the fan about the rotation axis and that internally includes an accommodation space accommodating the rotor core and the stator core; and a compressor configured to compress air. The inner circumferential surface of the housing has a cylindrical surface and a nozzle surface whose diameter expands outward in the radial direction along the rotation axis in downstream in a flow direction of an airflow relative to the cylindrical surface, the housing internally defines a cooling flow path configured to guide compressed air from the compressor to the accommodation space and a housing flow path configured to guide compressed air from the compressor to a boundary air outlet formed near a boundary between the cylindrical surface and the nozzle surface, and the boundary air outlet is oriented in a direction to blow compressed air along the nozzle surface in the flow direction.

Further, an aircraft according to one aspect of the present disclosure includes the fan device described above.

Advantageous Effects of Invention

According to the fan device and the aircraft having the same of the present disclosure, it is possible to obtain constant thrust even when a fan thereof stops and also cool a motor in a normal state.

DESCRIPTION OF EMBODIMENTS

A fan device and an aircraft having the same according to one embodiment of the present disclosure will be described below with reference to the drawings.

Figure 1:
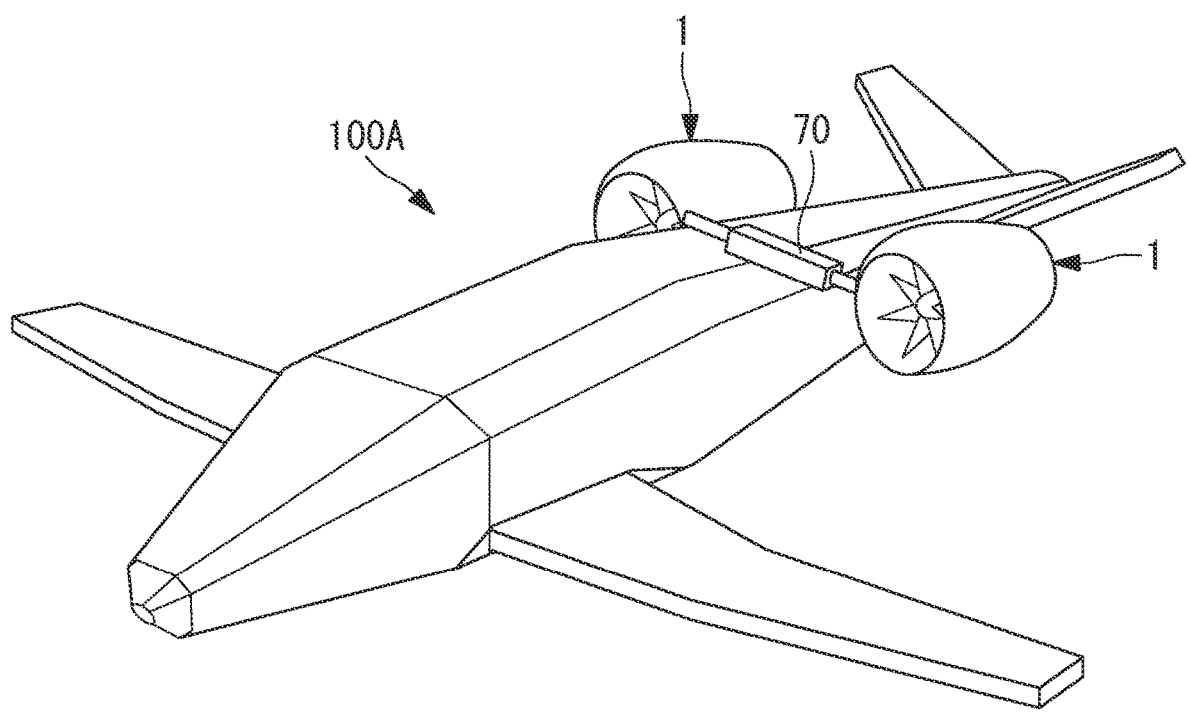
FIG. 1 is a perspective view of an aircraft according to one embodiment of the present disclosure.

As illustrated in FIG. 1, a fan device 1 is provided in an aircraft 100A.

The fan device 1 is a device that is powered by electricity and generates thrust required for taking-off, landing, navigation, or the like of the aircraft 100A.

The fan device 1 is configured to be able to tilt relative to the fuselage. Thus, the aircraft 100A is a so-called eVTOL aircraft that can perform vertical taking-off and landing.

Figure 2:
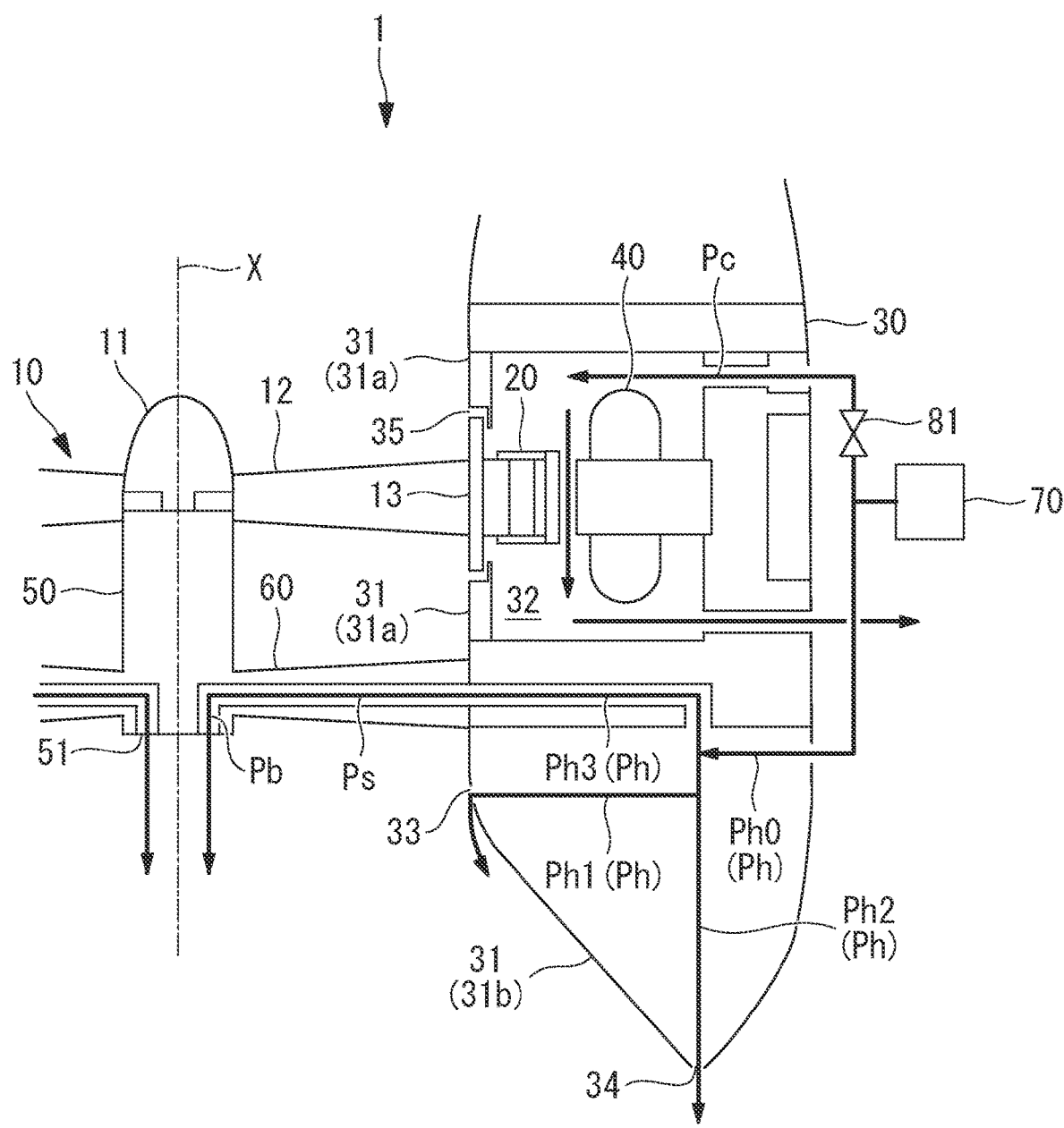
FIG. 2 is a longitudinal sectional view of a fan device according to one embodiment of the present disclosure.

As illustrated in FIG. 1 and FIG. 2, the fan device 1 includes a fan 10, rotor cores 20, a duct 30, stator cores 40, and a compressor 70.

As illustrated in FIG. 2, the fan 10 is a device that rotates about a rotation axis X to generate an airflow. The fan 10 generates an airflow in a direction from top to bottom in FIG. 2. The fan 10 includes a hub 11, a plurality of blades 12, and a rim 13.

The hub 11 is a component that is located on the rotation axis X and at the center of the fan 10 and serves as the rotation center of the fan 10. The hub 11 is rotatably, pivotably supported by a boss 50.

The boss 50 is a columnar component extending along the rotation axis X. The boss 50 is connected to and supported by an inner circumferential surface 31 of the duct 30 described later via a plurality of support members 60.

The support members 60 are members that are arranged radially relative to the rotation axis X and rigidly connect the boss 50 to the inner circumferential surface 31 of the duct 30.

Note that the fan 10 may be of a type where the hub 11 is rotatably, pivotably supported by the boss 50 or may be of a so-called shaftless type where the boss 50 is omitted.

The base ends of the blades 12 are connected and fixed to the hub 11. Each blade 12 extends radially relative to the rotation axis X. The blade 12 rotates about the rotation axis X together with the hub 11.

Respective tips of the plurality of blades 12 are connected via the single rim 13. The rim 13 is a member annular about the rotation axis X. The rim 13 rotates about the rotation axis X together with the blades 12.

The rotor cores 20 are members forming a motor of the outer circumferential drive type together with the stator cores 40 described later. Each rotor core 20 is fixed outside in the radial direction of the rim 13. The rotor core 20 includes a magnetic member (for example, a magnet). The rotor core 20 rotates about the rotation axis X together with the rim 13.

The duct 30 is a member that straightens an airflow generated by the fan 10. The duct 30 is a cylindrical member surrounding the fan 10 about the rotation axis X. The duct 30 includes the inner circumferential surface 31 and an accommodation space 32.

The inner circumferential surface 31 is a surface formed so as to surround the fan 10. The inner circumferential surface 31 includes a cylindrical surface 31$a$ and a nozzle surface 31$b$.

The cylindrical surface 31$a$ is a surface shaped in a cylinder having substantially a constant inner diameter along the rotation axis X. The cylindrical surface 31$a$ surrounds the hub 11, the blades 12, the boss 50, the support members 60, and the like. Note that the cylindrical surface 31$a$ is not necessarily required to have substantially a constant inner diameter and can be any surface that can roughly distinguish the boundary with respect to the nozzle surface 31$b$ described later.

The nozzle surface 31$b$ is a surface shaped in a nozzle face having the inner diameter expanding along the rotation axis X. The inner diameter of the nozzle surface 31$b$ expands as the nozzle surface 31$b$ approaches the downstream from the upstream. The nozzle surface 31$b$ is connected to the downstream end of the cylindrical surface 31$a$ continuously and smoothly. The sectional shape of the nozzle surface 31$b$ is straight in the case of FIG. 2. However, the sectional shape is not limited to such a shape, and the sectional shape may be curved. Thus, the nozzle surface 31$b$ may be a curved surface.

Note that "upstream" and "downstream" described above mean the upstream and the downstream in a flow direction of an airflow generated by the fan 10.

The accommodation space 32 is a space formed inside the duct 30. The accommodation space 32 is formed annularly about the rotation axis X. The accommodation space 32 accommodates the rotor cores 20 and the stator cores 40. The accommodation space 32 communicates via an opening 35 with a space surrounded by the duct 30, that is, a space in which the fan 10 is arranged.

The opening 35 is formed annularly about the rotation axis X so as to face the rotation axis X. The rim 13 of the fan 10 is arranged in such a form that closes the opening 35. In this state, the rim 13 and the inner circumferential surface 31 are substantially flushed. This enables an airflow generated by the fan 10 to smoothly flow.

The stator cores 40 are components forming a motor of the outer circumferential drive type together with the rotor cores 20 described above. Each stator core 40 includes an iron core and a coil wound around the iron core. The stator core 40 is configured to generate magnetic force by current. The stator cores 40 are provided so as to face the rotor cores 20 with a predetermined clearance in the radial direction relative to the rotation axis X.

The duct 30 configured as described above is provided with a cooling flow path Pc, a housing flow path Ph, and a communication flow path Ps and also a boundary air outlet 33 and a rear edge air outlet 34.

The cooling flow path Pc is a flow path that is defined inside the duct 30 and communicates outside of the duct 30 and the accommodation space 32 with each other. The compressor 70 is connected to the cooling flow path Pc. This enables air compressed by the compressor 70 (compressed air) to be guided to the accommodation space 32. Note that, in FIG. 2, the directions in which the compressed air flows are illustrated by solid-line arrows.

The compressor 70 is installed outside the duct 30 (see FIG. 1). Note that the installation place in FIG. 1 is an example, and the embodiment is not limited to this installation place.

As illustrated in FIG. 2, the compressed air guided to the accommodation space 32 flows through the clearance between the rotor core 20 and the stator core 40 and flows out of the accommodation space 32. In the case of FIG. 2, the compressed air flows out of the duct 30. At this time, the compressed air cools the rotor core 20 and the stator core 40 in the course of passing through the clearance between the rotor core 20 and the stator core 40. This makes it possible to cool the motor of the outer circumferential drive type.

The housing flow path Ph is a flow path defined inside the duct 30 and communicating with the outside of the duct 30. The housing flow path Ph is connected to the compressor 70 independently of the cooling flow path Pc. The housing flow path Ph includes a plurality of flow paths Ph0, Ph1, Ph2, and Ph3.

The flow path Ph0 is a flow path defined inside the duct 30 and communicating with outside of the duct 30. The flow path Ph0 is connected to the compressor 70 independently of the cooling flow path Pc. This enables air compressed by the compressor 70 to be guided to the housing flow path Ph.

The flow path Ph1 is a flow path that is defined inside the duct 30 and communicates the flow path Ph0 and the boundary air outlet 33 with each other. This enables air compressed by the compressor 70 to be guided to the boundary air outlet 33.

The boundary air outlet 33 is an opening provided near the boundary between the cylindrical surface 31a and the nozzle surface 31b. The boundary air outlet 33 is oriented in the direction to blow the compressed air along the nozzle surface 31b.

The compressed air blown from the boundary air outlet 33 flows along the nozzle surface 31b in the flow direction of the airflow. Accordingly, the air flows inside the inner circumferential surface 31 of the duct 30 due to an ejector effect (ejector principle). This generates an airflow different from the airflow generated by the fan 10 (hereafter, referred to as an "ejector effect airflow"). With such an ejector effect airflow, certain thrust can be obtained from compressed air as a power source even when the fan 10 stops, for example. Note that "thrust" as used herein is thrust replacing aerodynamic lift exerted by the autorotation function of a helicopter, that is, force against the falling of the aircraft 100A.

Further, when the fan 10 is operating, the ejector effect airflow works as additional thrust.

The flow path Ph2 is a flow path that is defined inside the duct 30 and communicates the flow path Ph0 and the rear edge air outlet 34 with each other. This enables air compressed by the compressor 70 to be guided to the rear edge air outlet 34.

The rear edge air outlet 34 is an opening provided in the rear edge of the nozzle surface 31b (the rear edge of the duct 30). The boundary air outlet 33 is oriented in the direction to blow the compressed air in the flow direction of the airflow generated by the fan 10.

The compressed air blown from the rear edge air outlet 34 is blown in the flow direction of the airflow generated by the fan 10. This makes it possible to attract the airflow flowing along the nozzle surface 31b and thus reduce separation.

The flow path Ph3 is a flow path that is defined inside the duct 30 and communicates the flow path Ph0 and the communication flow path Ps with each other. This enables air compressed by the compressor 70 to be guided to the communication flow path Ps.

The communication flow path Ps is a flow path defined inside each support member 60, which supports the boss 50, and extending toward the boss 50.

The boss 50 is provided with a boss flow path Pb and a boss air outlet 51. The boss flow path Pb is a flow path that communicates the communication flow path Ps and the boss air outlet 51 with each other. This enables air compressed by the compressor 70 to be guided to the boss air outlet 51.

The boss air outlet 51 is an opening provided in the end face downstream of the boss 50. The boss air outlet 51 is oriented in the direction to blow the compressed air in the flow direction of the airflow generated by the fan 10.

The compressed air blown from the boss air outlet 51 is blown in the flow direction of the airflow generated by the fan 10. This makes it possible to reduce separation of the airflow on the end face of the boss 50.

Figure 3:
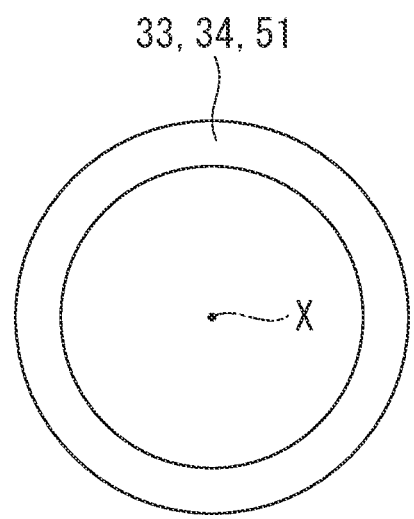
FIG. 3 is a diagram illustrating an example of the shape of a boundary air outlet, a rear edge air outlet, and a boss air outlet.
Figure 4:
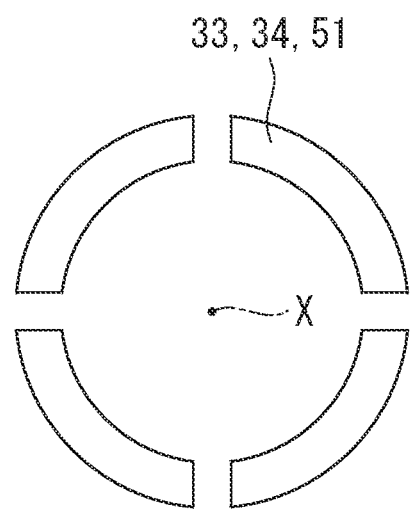
FIG. 4 is a diagram illustrating an example of the shape of a boundary air outlet, a rear edge air outlet, and a boss air outlet.

Each of the boundary air outlet 33, the rear edge air outlet 34, and the boss air outlet 51 described above may be an annular opening about the rotation axis X as the center when viewed from the direction of the rotation axis X, as illustrated in FIG. 3. Alternatively, as illustrated in FIG. 4, each of the above air outlets may be formed of a plurality of arc-shaped openings about the rotation axis X as the center. Alternatively, as illustrated in FIG. 5, each of the above air outlets may be formed of a plurality of circular openings arranged at the same interval about the rotation axis X as the center.

Figure 5:
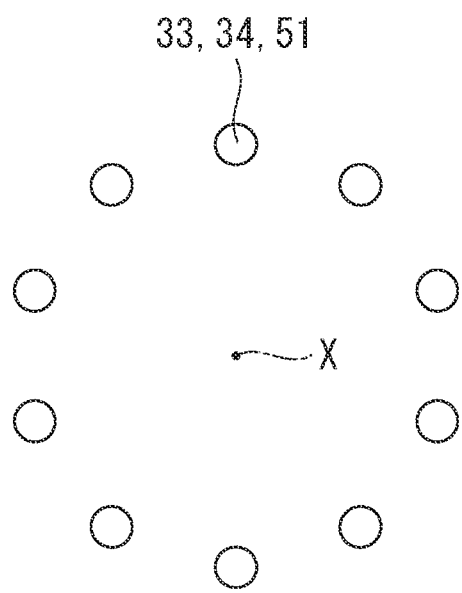
FIG. 5 is a diagram illustrating an example of the shape of a boundary air outlet, a rear edge air outlet, and a boss air outlet.
Figure 6:
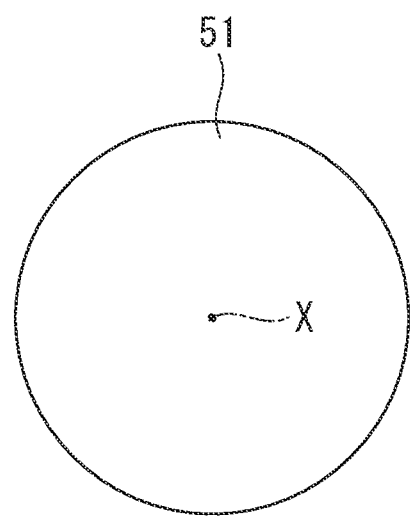
FIG. 6 is a diagram illustrating an example of the shape of a boss air outlet.

Alternatively, the boss air outlet 51 may be a circular opening about the rotation axis X as the center as illustrated in FIG. 6 other than the shapes illustrated in FIG. 3 to FIG. 5.

As illustrated in FIG. 2, a valve 81 may be provided between the cooling flow path Pc and the compressor 70. This makes it possible to guide the whole amount of compressed air to the housing flow path Ph when the motor is not required to be cooled.

The case where the motor is not required to cooled refers to a case where the fan 10 is no longer driven due to a failure, for example. This is because the motor does not generate heat when the fan 10 is no longer driven.

Under such a situation, it is required to ensure thrust that replaces the autorotation function by using the ejector effect airflow. In terms of maximizing the thrust, it is advantageous to guide the whole amount of compressed air to the housing flow path Ph.

Further, a valve (not illustrated) may be provided in each of the flow paths Ph1, Ph2, and Ph3. This makes it possible to suitably adjust the flow rate of compressed air blown from each air outlet.

Note that the boundary air outlet 33 is an essential feature for generating an ejector effect airflow. However, the rear edge air outlet 34 and the boss air outlet 51 are not necessarily an essential component in generating an ejector effect airflow. Thus, the rear edge air outlet 34 and/or the boss air outlet 51 can be omitted from the fan device 1.

Note that, in a case of the fan device 1 of the shaftless type having no support member 60, the boss air outlet 51 is unnecessary.

According to the present embodiment, the following advantageous effects are achieved.

In an electric fan of the so-called outer circumferential drive type, compressed air compressed by the compressor 70 can be guided via the cooling flow path Pc to the accommodation space 32 in which the rotor cores 20 and the stator cores 40 forming a motor are accommodated. This makes it possible to forcibly cool the motor (the rotor cores 20 and the stator cores 40) that is also a heat generation source.

Further, the compressed air can be blown from the boundary air outlet 33 formed near the boundary between the cylindrical surface 31a and the nozzle surface 31b. At this time, the compressed air from the boundary air outlet 33 is blown along the nozzle surface 31b in the flow direction of an airflow generated by the fan 10. Accordingly, air flows into the inside of the inner circumferential surface 31 of the duct 30 due to the ejector effect (ejector principle). As a result, an airflow different from the airflow generated by the fan 10 (hereafter, referred to as an "ejector effect airflow") occurs. With such an ejector effect airflow, certain thrust can be obtained even when the fan 10 stops, for example. Further, when the fan 10 is operating, the ejector effect airflow works as additional thrust.

Further, the compressed air can be blown from the rear edge air outlet 34 formed in the rear edge in the flow direction of the nozzle surface 31b. As this time, the compressed air from the rear edge air outlet 34 is blown in the flow direction of the airflow generated by the fan 10. This makes it possible to attract the airflow flowing along the nozzle surface 31b and thus reduce separation, so that the thrust can be further increased.

Further, the compressed air can be blown from the boss air outlet 51 formed in the end face of the boss 50 via the communication flow path Ps and the boss flow path Pb. At this time, the compressed air from the boss air outlet 51 is blown in the flow direction of the airflow generated by the fan 10. This can reduce separation of the airflow on the end face of the boss 50. As a result, the air resistance on the end face of the boss 50 can be reduced.

Further, when the cooling flow path Pc and the housing flow path Ph are independent of each other, it is possible to set flow rates of the compressed air in accordance with respective purposes.

Further, when the housing flow path Ph (the flow path Ph0) communicates with the accommodation space 32, the compressed air guided to the accommodation space 32 can be blown from each air outlet 33, 34, 51. Thus, cooling of the motor and blowing of the compressed air can be performed with a single path and simple structure.

Modified Example 1

Figure 7:
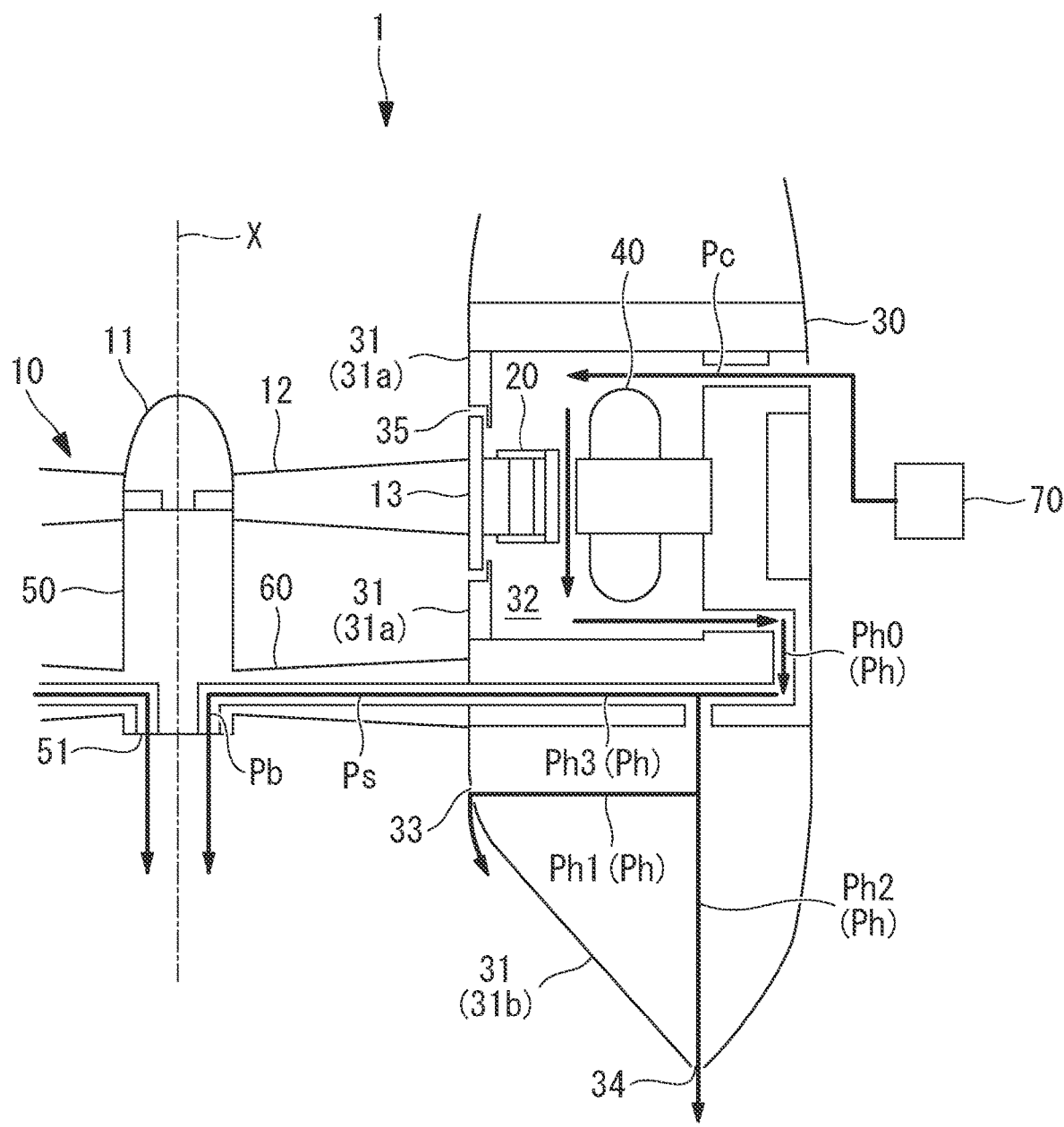
FIG. 7 is a longitudinal sectional view of a modified example of the fan device according to one embodiment of the present disclosure.

As illustrated in FIG. 7, the flow path Ph0 of the housing flow path Ph may be formed to communicate with the accommodation space 32. In such a case, the flow path Ph0 is not directly connected to the compressor 70 but indirectly connected to the compressor 70 via the cooling flow path Pc and the accommodation space 32.

This enables compressed air guided to the accommodation space 32 to be blown from the boundary air outlet 33, the rear edge air outlet 34, and the boss air outlet 51. Thus, cooling of the motor and blowing of the compressed air can be performed with a single path and simple structure.

Modified Example 2

Figure 8:
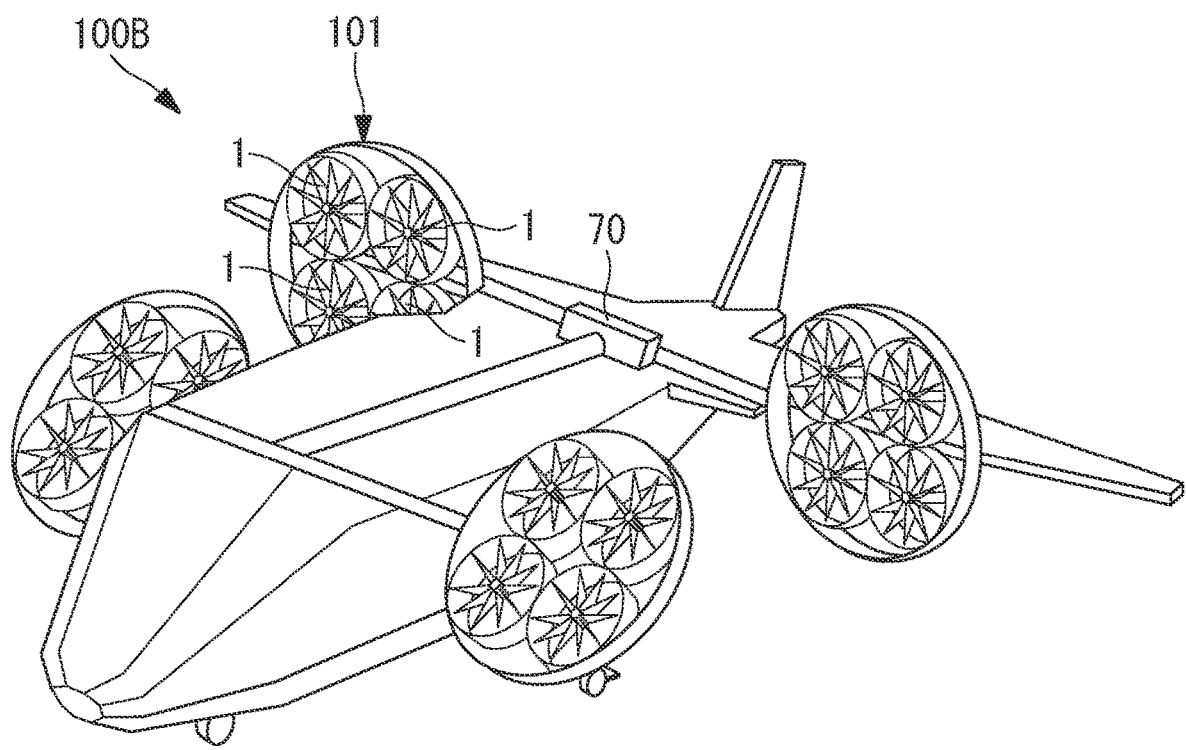
FIG. 8 is a perspective view of a modified example of an aircraft according to one embodiment of the present disclosure.

Further, as illustrated in FIG. 8, a single multi-fan 101 may be formed of a plurality of fan devices 1. In such a case, the aircraft 100B includes a plurality of multi-fans 101. The fan device 1 of each of the multi-fans 101 may be supplied with compressed air from a shared compressor 70.

Modified Example 3

Figure 9:
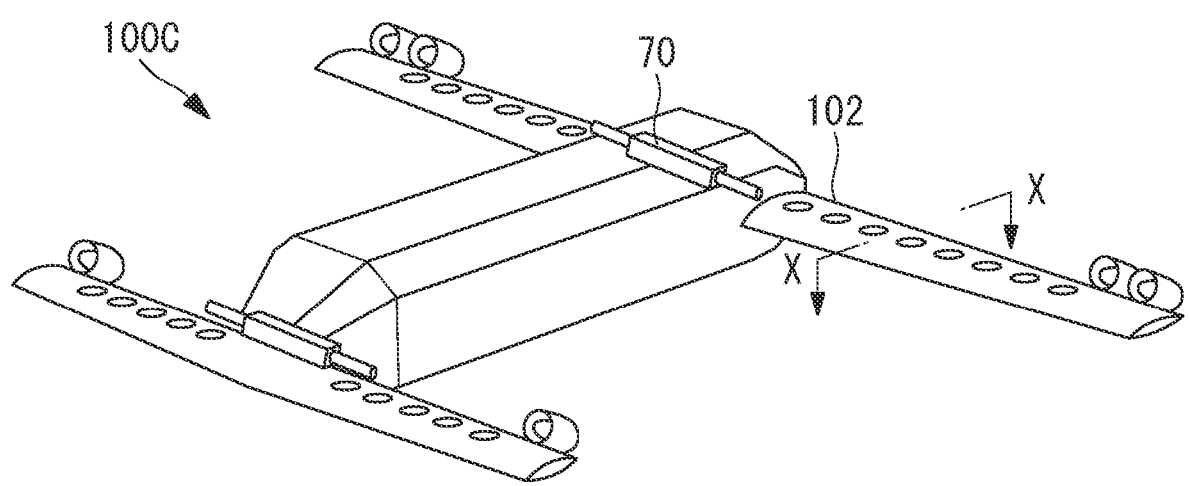
FIG. 9 is a perspective view of a modified example of an aircraft according to one embodiment of the present disclosure.
Figure 10:
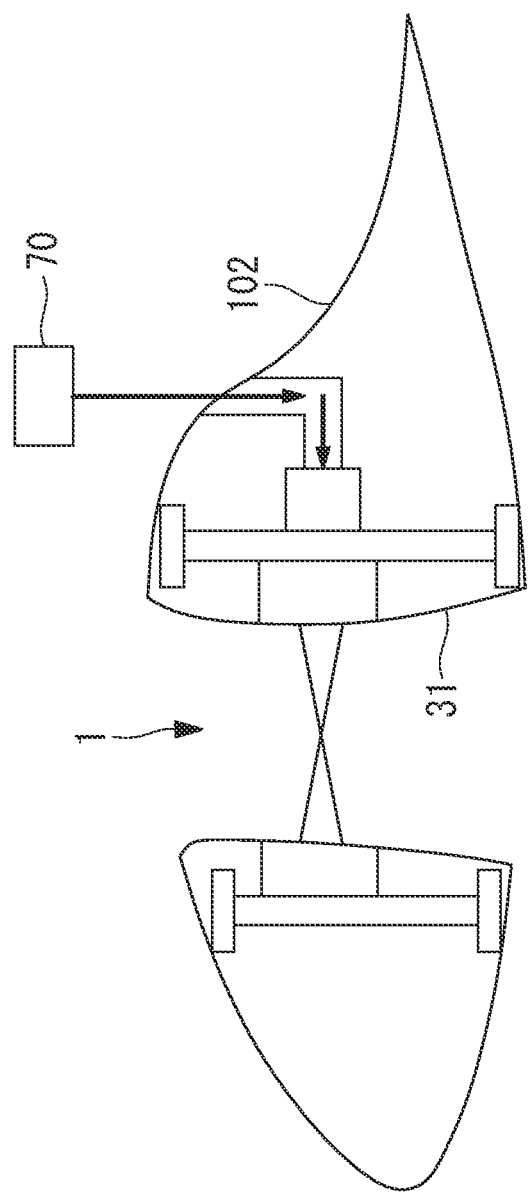
FIG. 10 is a sectional view taken along a cut line X-X illustrated in FIG. 9.

Further, as illustrated in FIG. 9 and FIG. 10, the fan devices 1 may be incorporated in wings 102 of an aircraft 100C. In such a case, instead of the duct 30, the inner circumferential surface 31, each air outlet, and each flow path are formed in each of the wings 102.

The embodiment described above is understood as follows, for example.

The fan device (1) according to one aspect of the present disclosure includes: a fan (10) including a plurality of blades (12) each extending in a radial direction relative to a rotation axis (X), the fan (10) being configured to rotate about the rotation axis (X) and generate an airflow; a rotor core (20) provided outside in the radial direction of the fan (10); a stator core (40) provided at a position facing the rotor core (20) in the radial direction; a housing (30, 102) that forms an inner circumferential surface (31) surrounding the fan (10) about the rotation axis (X) and that internally includes an accommodation space (32) accommodating the rotor core (20) and the stator core (40); and a compressor (70) configured to compress air. The inner circumferential surface (31) of the housing has a cylindrical surface (31*a*) and a nozzle surface (31*b*) whose diameter expands outward in the radial direction along the rotation axis (X) in downstream in a flow direction of an airflow relative to the cylindrical surface (31*a*), the housing (30, 102) internally defines a cooling flow path (Pc) configured to guide compressed air from the compressor (70) to the accommodation space (32) and a housing flow path (Ph) configured to guide compressed air from the compressor (70) to a boundary air outlet (33) formed near a boundary between the cylindrical surface (31*a*) and the nozzle surface (31*b*), and the boundary air outlet (33) is oriented in a direction to blow compressed air along the nozzle surface (31*b*) in the flow direction.

According to the fan device (1) of the present aspect, in an electric fan of the so-called outer circumferential drive type, compressed air compressed by the compressor (70) can be guided via the cooling flow path (Pc) to the accommodation space (32) in which the rotor cores (20) and the stator cores (40) that serve as a drive unit are accommodated. This makes it possible to forcibly cool the motor (the rotor cores (20) and the stator cores (40)) that is also a heat generation source.

Further, the compressed air can be blown from the boundary air outlet (33) formed near the boundary between the cylindrical surface (31*a*) and the nozzle surface (31*b*). At this time, the compressed air from the boundary air outlet (33) is blown along the nozzle surface (31*b*) in the flow direction of the airflow generated by the fan (10). Accordingly, air flows into the inside of the inner circumferential surface (31) of the housing (30, 102) due to the ejector effect (ejector principle). As a result, an airflow different from the airflow generated by the fan (10) (hereafter, referred to as an "ejector effect airflow") is generated. With such an ejector effect airflow, certain thrust can be obtained even when the fan (10) stops, for example. Further, when the fan (10) is operating, the ejector effect airflow works as additional thrust.

Further, in the fan device (1) according to one aspect of the present disclosure, the housing flow path (Ph) guides compressed air to a rear edge air outlet (34) formed in a rear edge in the flow direction of the nozzle surface (31*b*), and the rear edge air outlet (34) is oriented in a direction to blow the compressed air in the flow direction.

According to the fan device (1) of the present aspect, the compressed air can be blown from the rear edge air outlet (34) formed in the rear edge in the flow direction of the nozzle surface (31*b*). At this time, the compressed air from the rear edge air outlet (34) is blown in the flow direction of the airflow generated by the fan (10). This makes it possible to attract the airflow flowing along the nozzle surface (31*b*) and thus reduce separation, so that the thrust can be further increased.

Further, the fan device (1) according to one aspect of the present disclosure includes: a boss (50) that pivotably supports the fan (10) about the rotation axis (X); and a support member (60) that supports the boss (50) to the housing (30, 102), the support member (60) internally defines a communication flow path (Ps) configured to guide compressed air from the housing flow path (Ph) to the boss (50), the boss (50) internally defines a boss flow path (Pb) configured to guide compressed air to a boss air outlet (51) formed in an end face downstream in the flow direction from the communication flow path (Ps), and the boss air outlet (51) is oriented in a direction to blow compressed air in the flow direction.

According to the fan device (1) of the present aspect, the compressed air can be blown from the boss air outlet (51) formed in the end face of the boss (50) via the communication flow path (Ps) and the boss flow path (Pb). At this time, the compressed air from the boss air outlet (51) is blown in the flow direction of the airflow generated by the fan (10). This can reduce separation of the airflow on the end face of the boss (50). As a result, the air resistance on the end face of the boss (50) can be reduced.

Further, in the fan device (1) according to one aspect of the present disclosure, the cooling flow path (Pc) and the housing flow path (Ph) may be independent of each other.

According to the fan device (1) of the present aspect, the cooling flow path (Pc) and the housing flow path (Ph) are independent of each other, and it is thus possible to set flow rates of the compressed air in accordance with respective purposes.

Further, in the fan device (1) according to one aspect of the present disclosure, the housing flow path (Ph) may communicate with the accommodation space (32).

According to the fan device (1) of the present aspect, since the housing flow path (Ph) communicates with the accommodation space (32), the compressed air guided to the accommodation space (32) can be blown from each air outlet (33, 34, 51). Thus, cooling of the motor and blowing of the compressed air can be performed with a single path and simple structure.

Further, in the fan device (1) according to one aspect of the present disclosure, the housing (30) is a duct (30).

Further, in the fan device (1) according to one aspect of the present disclosure, the housing (102) is a wing (102) of an aircraft (100C).

Further, an aircraft (100A, 100B, 100C) according to one aspect of the present disclosure includes the fan device (1) described above.

REFERENCE SIGNS LIST 1 fan device
10 fan
11 hub
12 blade
13 rim
20 rotor core
30 duct (housing)
31 inner circumferential surface
31a cylindrical surface
31b nozzle surface
32 accommodation space
33 boundary air outlet
34 rear edge air outlet
35 opening
40 stator core
50 boss
51 boss air outlet
60 support member
70 compressor
81 valve
100A, 100B, 100C aircraft
101 multi-fan
102 wing
Pb boss flow path
Pc cooling flow path
Ph housing flow path
Ph0, Ph1, Ph2, Ph3 flow path (housing flow path)
Ps communication flow path
X rotation axis

The invention claimed is:

1. A fan device comprising:
a fan including a plurality of blades each extending in a radial direction relative to a rotation axis, the fan being configured to rotate about the rotation axis and generate an airflow;
a rotor core provided outside in the radial direction of the fan;
a stator core provided at a position facing the rotor core in the radial direction;
a housing that forms an inner circumferential surface surrounding the fan about the rotation axis and that internally includes an accommodation space accommodating the rotor core and the stator core; and
a compressor configured to compress air,
wherein the inner circumferential surface of the housing has a cylindrical surface and a nozzle surface whose diameter expands outward in the radial direction along the rotation axis in downstream in a flow direction of an airflow relative to the cylindrical surface,
wherein the housing internally defines a cooling flow path configured to guide compressed air from the compressor to the accommodation space and a housing flow path configured to guide compressed air from the compressor to a boundary air outlet formed in a vicinity of a boundary between the cylindrical surface and the nozzle surface, and
wherein the boundary air outlet is oriented in a direction to blow compressed air along the nozzle surface in the flow direction.

2. The fan device according to claim 1,
wherein the housing flow path guides compressed air to a rear edge air outlet formed in a rear edge in the flow direction of the nozzle surface, and
wherein the rear edge air outlet is oriented in a direction to blow compressed air in the flow direction.

3. The fan device according to claim 1 further comprising:
a boss that pivotably supports the fan about the rotation axis; and
a support member that supports the boss to the housing,
wherein the support member internally defines a communication flow path configured to guide compressed air from the housing flow path to the boss,
wherein the boss internally defines a boss flow path configured to guide compressed air to a boss air outlet formed in an end face downstream in the flow direction from the communication flow path, and
wherein the boss air outlet is oriented in a direction to blow compressed air in the flow direction.

4. The fan device according to claim 1, wherein the cooling flow path and the housing flow path are independent of each other.

5. The fan device according to claim 1, wherein the housing flow path communicates with the accommodation space.

6. The fan device according to claim 1, wherein the housing is a duct.

7. The fan device according to claim 1, wherein the housing is a wing of an aircraft.

8. An aircraft comprising the fan device according to claim 1.

* * * * *